Aug. 24, 1954 W. H. ARMACOST 2,687,096
SEAL IN CENTRIFUGAL PUMP
Filed Jan. 26, 1950
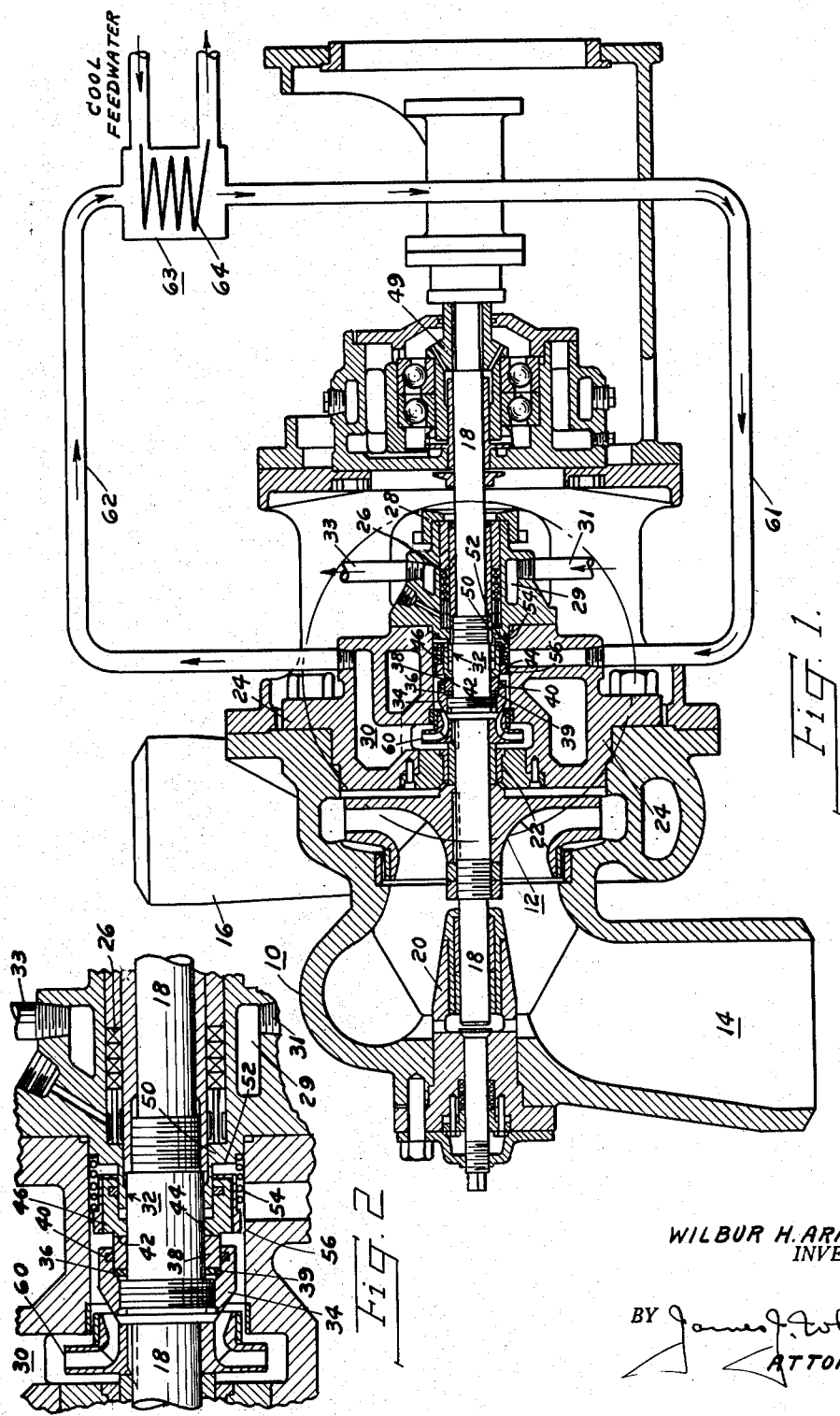
WILBUR H. ARMACOST
INVENTOR.

Patented Aug. 24, 1954

2,687,096

UNITED STATES PATENT OFFICE 2,687,096

SEAL IN CENTRIFUGAL PUMP

Wilbur H. Armacost, Scarsdale, N. Y., assignor to Combustion Engineering, Inc., New York, N. Y., a corporation of Delaware Application January 26, 1950, Serial No. 140,636

3 Claims. (Cl. 103—111)

The present invention relates to pumps and particularly to improved sealing means for minimizing the escape of fluid from high pressure centrifugal pumps.

In the operation of centrifugal pumps, especially at high pressure and at high temperature as in forced circulation boilers, some of the pressure fluid tends to leak from the pump through the space between the shaft for the impeller and its bearing. Heretofore to minimize such leakage it has been customary to provide special packings and glands at the outer end of the shaft. In other cases a chamber has been formed in the bearing structure outwardly of the bearing proper through which a fluid under pressure has been circulated to oppose the escape of pressure fluid from the pump impeller. None of these expedients has been found to be wholly satisfactory for use with centrifugal pumps at high pressure and at high temperature and the present invention contemplates the employment of an improved type of mechanical seal and packing gland or stuffing box. This consists essentially of a pair of metallic members carried respectively by the shaft and the stationary housing and forming between them a seal to preclude the escape of the pressure fluid. This seal is associated with the "soft packing" in the gland at the outer end of the shaft and both are maintained cool by circulating a cooled fluid through a chamber between the bearing and gland and in which the mechanical seal is located.

The invention will be best understood upon consideration of the following detailed description of an illustrative embodiment thereof when read in conjunction with the accompanying drawings in which:

Figure 1 is an axial sectional view of part of a centrifugal pump embodying the invention with certain allied parts shown diagrammatically; and Figure 2 is a view on an enlarged scale of the mechanical seal shown in the encircled area in Figure 1.

In the drawings the centrifugal pump illustrated is of conventional type having a casing 10 enclosing an impeller 12 into which water is drawn through the suction inlet 14 to be discharged through the outlet 16. The shaft 18 carrying the impeller is journalled on the suction side in a bearing designated as a whole by the numeral 20 and at the opposite side of the impeller is journalled in a guide bearing 22 carried by the cover plate 24. Outwardly beyond the bearing 22 the soft packing 26 and associated gland 28 are provided. A cooling fluid is circulated through a jacket 29 surrounding the packing 26, entering through pipe 31 and being discharged through pipe 33. In Fig. 1 the shaft 18 extends to the right in conventional manner into another bearing 49.

In accordance with the present invention the housing for the mechanical seal is formed between the bearing 22 at the pressure side of the impeller 12 and the packing 26 with a chamber 30 within which is mounted a mechanical seal designated as a whole in Figure 1 by the numeral 32 and illustrated on a larger scale in Figure 2. This mechanical seal 32 consists as shown in Fig. 2 of a carrier or retainer sleeve 34 secured to the shaft 18 and countersunk at its outer or right hand end to provide a recess 36 within which is received an annular metallic sealing ring 38 closely fitting the shaft 18 with associated ring gaskets 39, 40 in the carrier 34. The right hand end of the sealing ring 38 projects beyond the carrier 34 and provides an annular sealing face 42 which is maintained in contact with the confronting annular sealing face 44 on the left hand end of a complementary sealing sleeve 46 supported for slideable movement along the shaft 18 on a circular boss 50 projecting into the chamber 30 from the inner face of its outer end wall 52 inwardly of the packing 26. A spring 54 mounted between the inner end wall 52 of the chamber 30 and a flange 56 on the sleeve 46 urges the latter to the left to maintain its end face 44 in sealing contact with the face 42 on the ring 38 that turns with the shaft.

During operation of the pump a cooling fluid is circulated through the chamber 30 by a secondary impeller 60 on the shaft 18. The cooling fluid is admitted to the chamber 30 through an inlet conduit 61 and discharged therefrom through an outlet conduit 62, these conduits forming part of a closed circuit as shown in Fig. 1 which includes a heat exchanger 63. To maintain the seal 32, the cooling fluid carries away the heat which is in turn dissipated by circulating a relatively colder fluid through the coil 64 of the heat exchanger 63. The secondary impeller 60 may be designed to have the same discharge pressure as the water pumped by the main impeller 12.

The heat imparted to the bearing 22 and pump casing and other parts of the pump by the hot boiler water handled by the main pump impeller 12 is absorbed by the cooling fluid circulated through chamber 30 by the auxiliary impeller 60. Thus, the soft packing 26 being in contact only with the body of cooler fluid in chamber 30 is in effect insulated thereby from the effects of this heat and protected again deterioration.

The contacting faces 42 and 44 respectively of the sealing ring 38 that rotates with the shaft 18 and the complementary sleeve 46 carried by the housing are preferably made of alloy suitable for resisting wear at high temperatures and adapted for lubrication by water.

What I claim is:

1. In a centrifugal pump having an impeller enclosed within a housing provided with a bearing for the impeller shaft together with a stuffing box for the latter and a chamber between said stuffing box and the bearing on the pressure side of the impeller; the improvement comprising an annular sealing ring in said chamber mounted for rotation with said shaft and presenting an annular sealing surface disposed normally to the shaft axis; a complementary sealing sleeve supported for movement along said shaft in a location between said stuffing box and sealing ring and presenting an annular sealing face normal to the shaft axis and confronting that of said ring; spring means acting on said sleeve to urge its inner annular end face into engagement with the end face of the ring carried by said carrier to form a seal for minimizing the flow of pressure fluid between said bearing and shaft and along the latter to said stuffing box; a source of cooling fluid including supply and discharge connections leading to and from said chamber; and a secondary impeller secured to said shaft within said chamber for circulating cooling fluid through the latter to carry off the heat imparted to said bearing and casing by hot fluid handled by said pump.

2. In a centrifugal pump having an impeller enclosed within a housing provided with a bearing for the impeller shaft together with a stuffing box for the latter and a chamber between said stuffing box and the bearing on the pressure side of the impeller; the improvement comprising a retainer sleeve secured to said shaft within said chamber formed at its outer end with a countersunk recess; an annular metallic sealing ring closely fitting said shaft carried in said recess and projecting outwardly therefrom to present an annular sealing surface disposed normally to the shaft axis; a circular boss formed within said chamber on its outer end wall surrounding said shaft; a complementary metallic sealing sleeve slidably mounted on said boss between said stuffing box and sealing ring and presenting an annular sealing surface normal to the shaft axis and confronting that of said ring; spring means acting between the outer end wall of said chamber and said sleeve to urge the inner annular end face thereof into engagement with the end face of the ring carried by said carrier to form a seal for minimizing the flow of pressure fluid between said bearing and shaft and along the latter to said stuffing box; a source of cooling fluid including supply and discharge connections leading to and from said chamber; and a secondary impeller secured to said shaft within said chamber for circulating cooling fluid through the latter to carry off the heat imparted to said bearing and casing by hot fluid handled by said pump.

3. In a centrifugal pump having an impeller enclosed within a housing provided with a bearing for the impeller shaft together with a stuffing box for the latter and a chamber between said stuffing box and the bearing on the pressure side of the impeller; the improvement comprising a retainer sleeve secured to said shaft within said chamber; an annular metallic sealing ring carried by said retainer and presenting an annular sealing surface disposed normally to the shaft axis; a complementary metallic sealing sleeve supported for movement on said shaft between said stuffing box and sealing ring and presenting an annular sealing surface normal to the shaft axis and confronting that of said ring; spring means acting on said sleeve to urge its inner annular end face into engagement with the end face of the ring carried by said carrier to form a seal for minimizing the flow of pressure fluid between said bearing and shaft and along the latter to said stuffing box; supply and discharge conduits for a cooling fluid connected to circulate said fluid through said chamber, said conduits being interconnected to form a closed circuit; a heat exchanger interposed in said circuit operable to regulate the temperature of the cooling fluid in said circuit; and means for producing a positive circulation of said fluid through said closed circuit.

References Cited in the file of this patent

UNITED STATES PATENTS

| Number | Name | Date |
| --- | --- | --- |
| 1,874,324 | MacMeeken | Aug. 30, 1932 |
| 1,909,410 | Klosson | May 16, 1933 |
| 1,910,811 | Peterson | May 23, 1933 |
| 2,332,150 | Huff | Oct. 19, 1943 |
| 2,375,085 | Curtis | May 1, 1945 |
| 2,436,514 | Jennings | Feb. 24, 1948 |
| 2,436,866 | Lancaster | Mar. 2, 1948 |
| 2,494,887 | Lenhart | Jan. 17, 1950 |

FOREIGN PATENTS

| Number | Country | Date |
| --- | --- | --- |
| 333,113 | Germany | Feb. 17, 1921 |